Aug. 1, 1961  W. R. BERCAW ET AL  2,994,170
PACKAGING APPARATUS
Filed Oct. 14, 1959  7 Sheets-Sheet 6
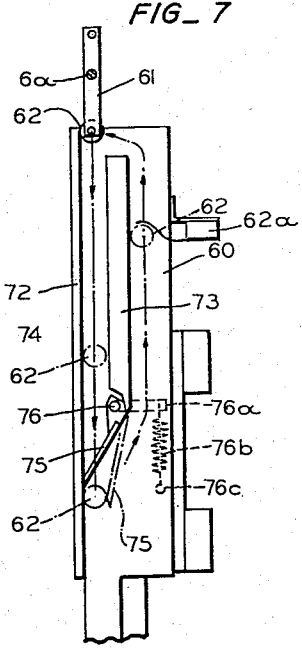
FIG_7
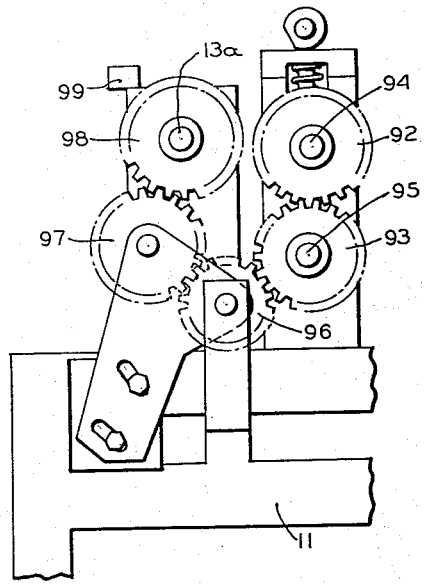
FIG_8
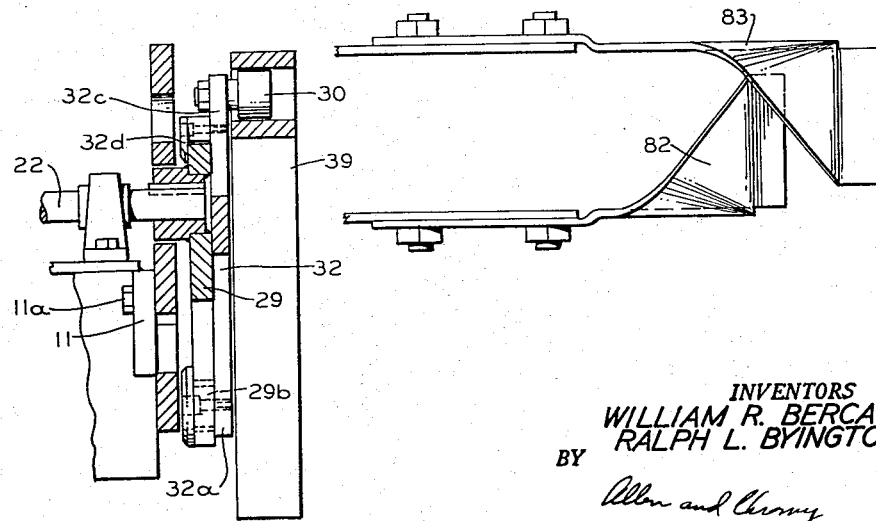
FIG_9  FIG_3a
INVENTORS
WILLIAM R. BERCAW
RALPH L. BYINGTON
BY
ATTORNEYS Aug. 1, 1961 W. R. BERCAW ET AL 2,994,170
PACKAGING APPARATUS
Filed Oct. 14, 1959 7 Sheets-Sheet 7
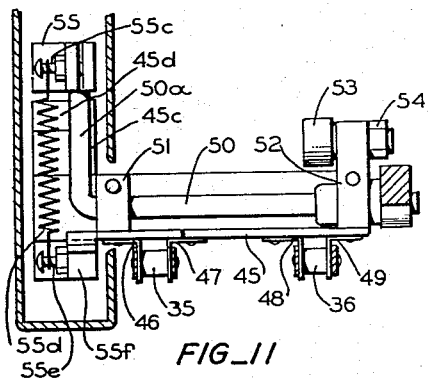
FIG_11
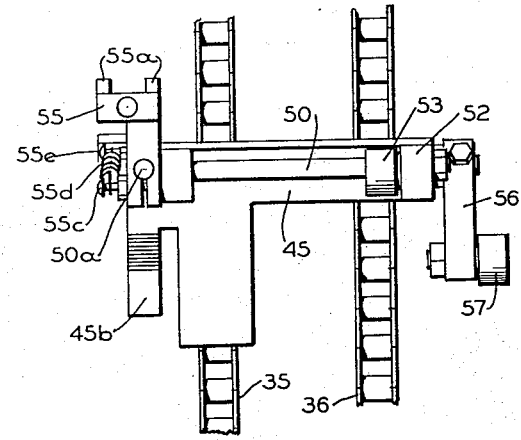
FIG_12
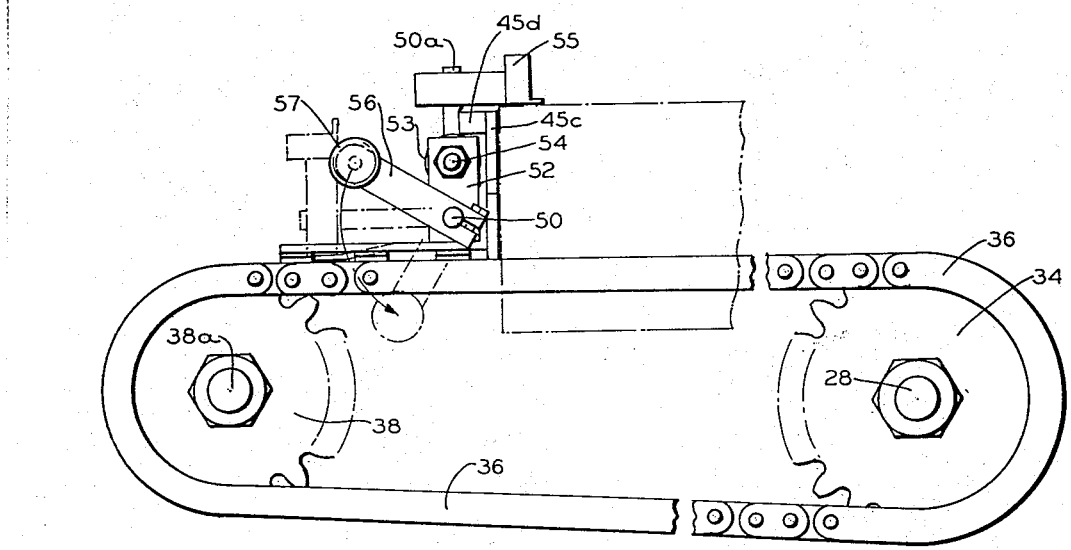
FIG_10
INVENTORS
WILLIAM R. BERCAW
RALPH L. BYINGTON
BY
ATTORNEYS

United States Patent Office 2,994,170
Patented Aug. 1, 1961

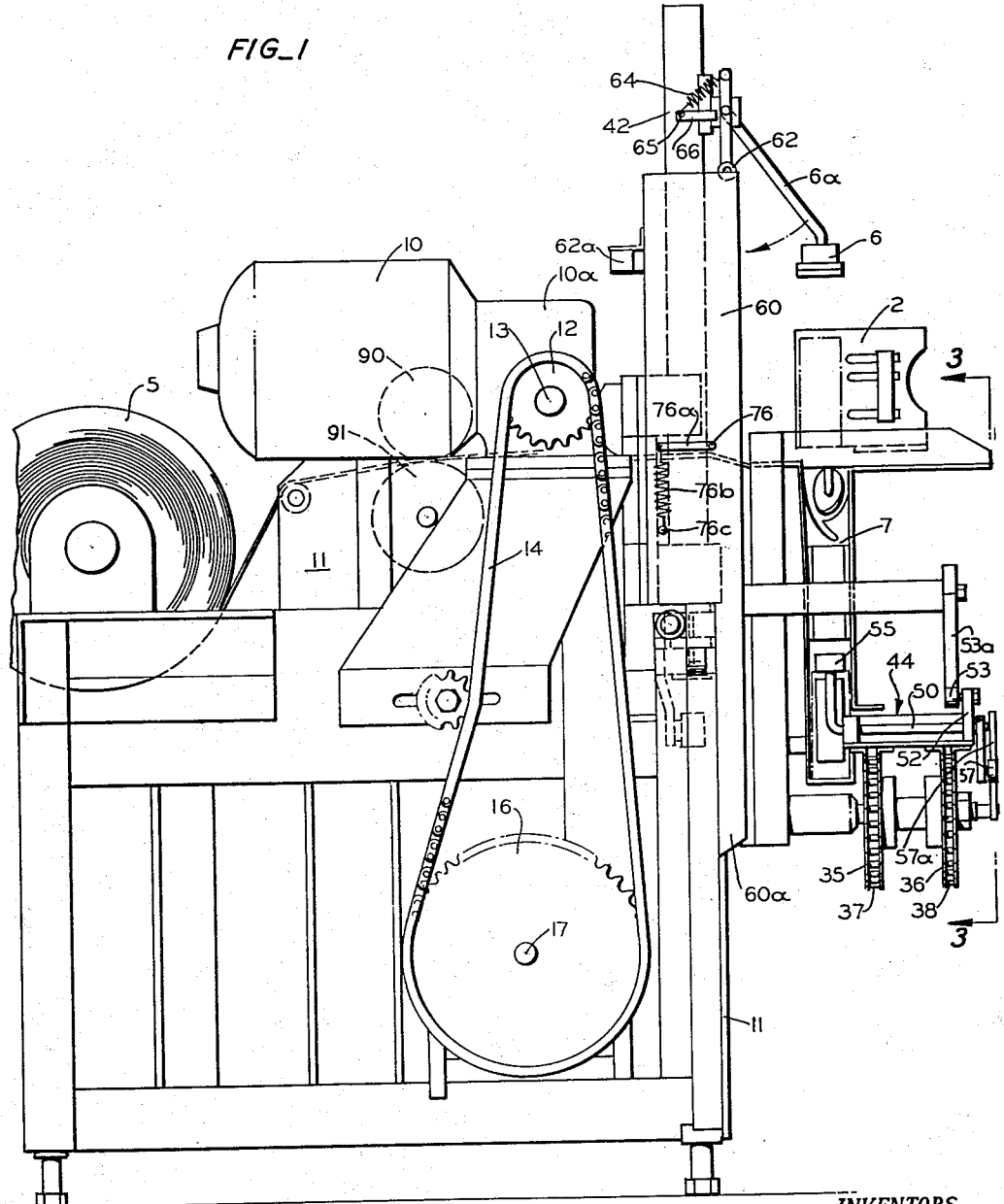

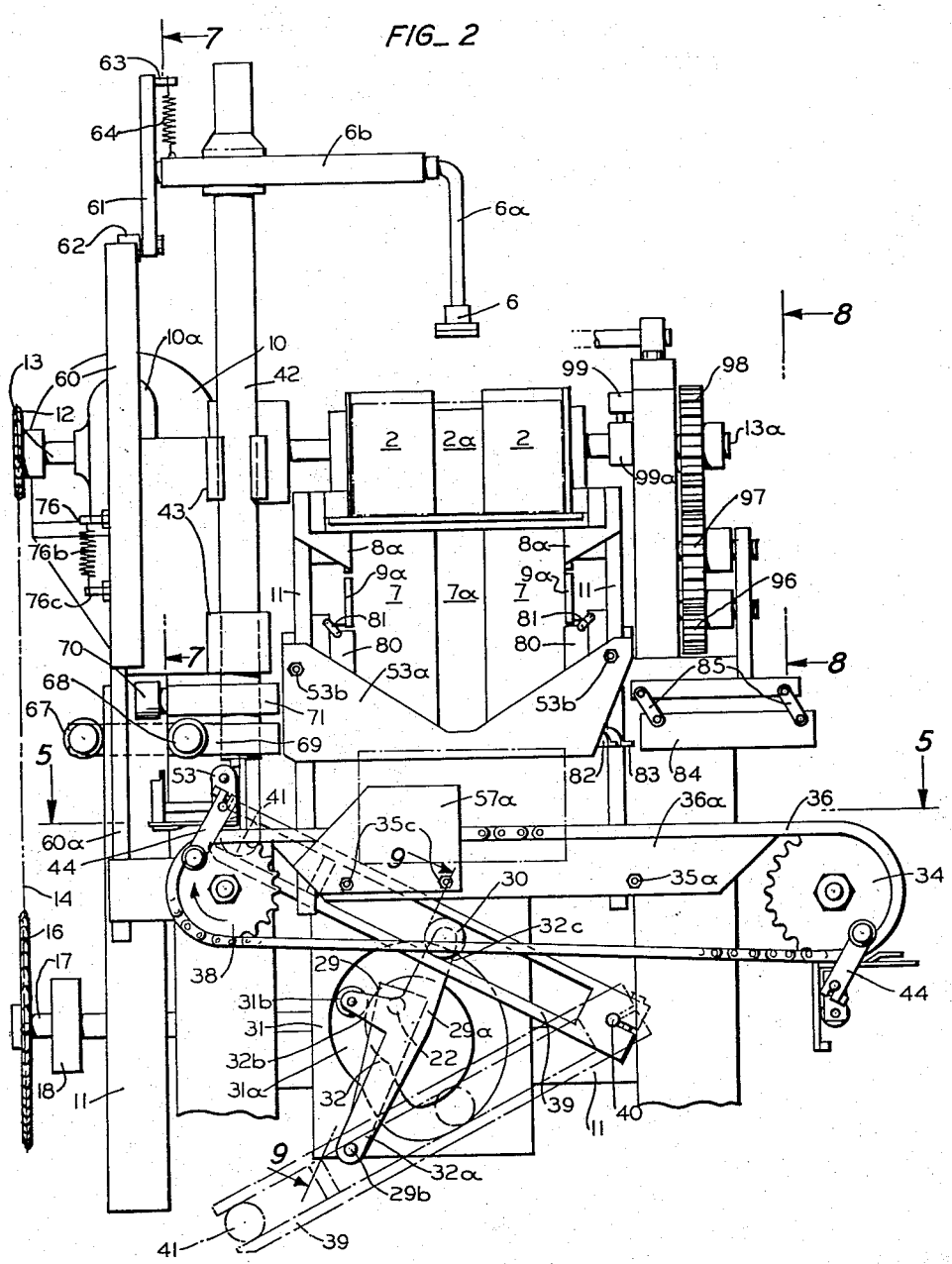

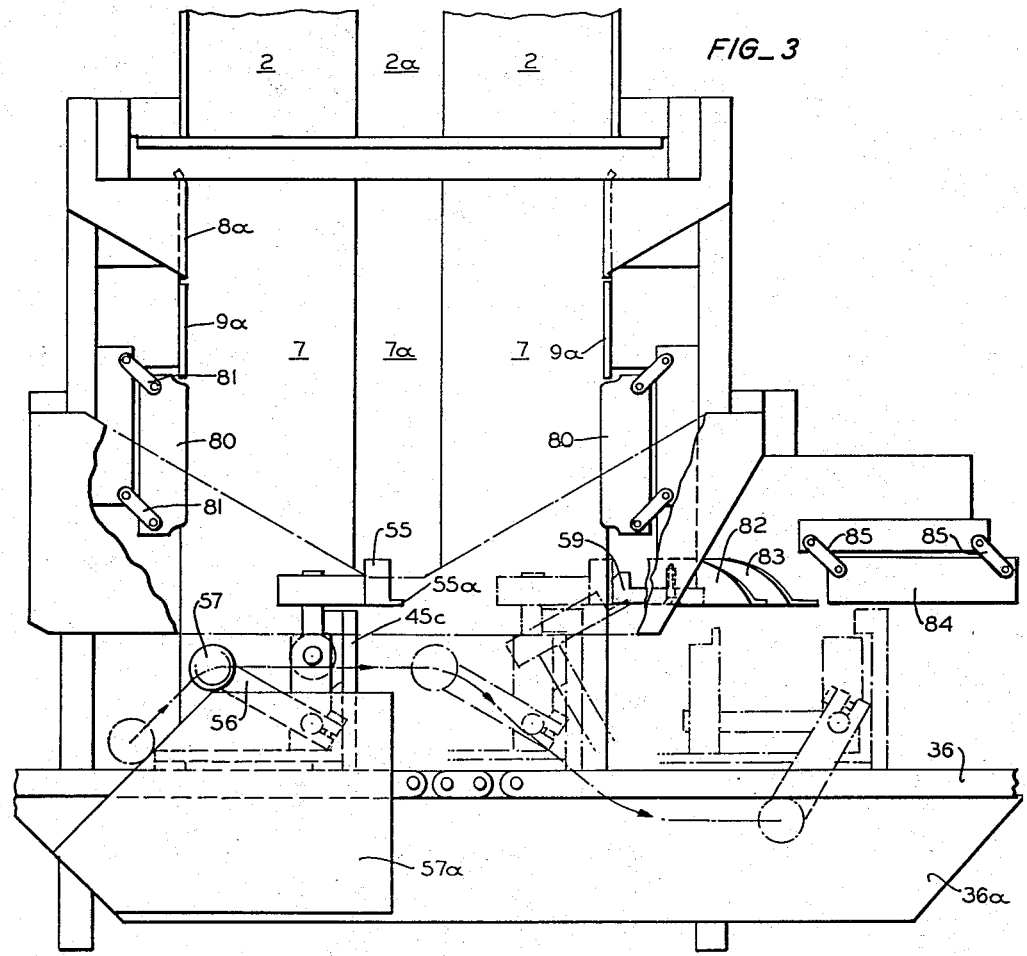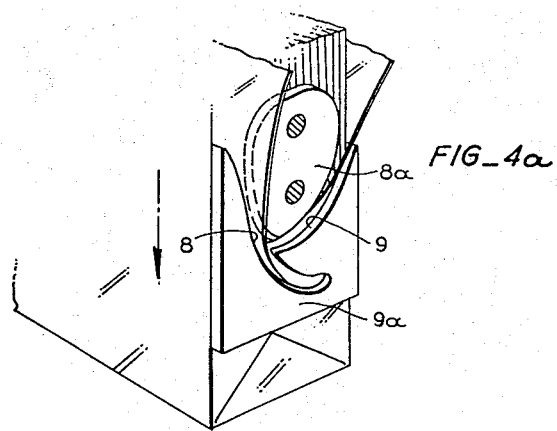

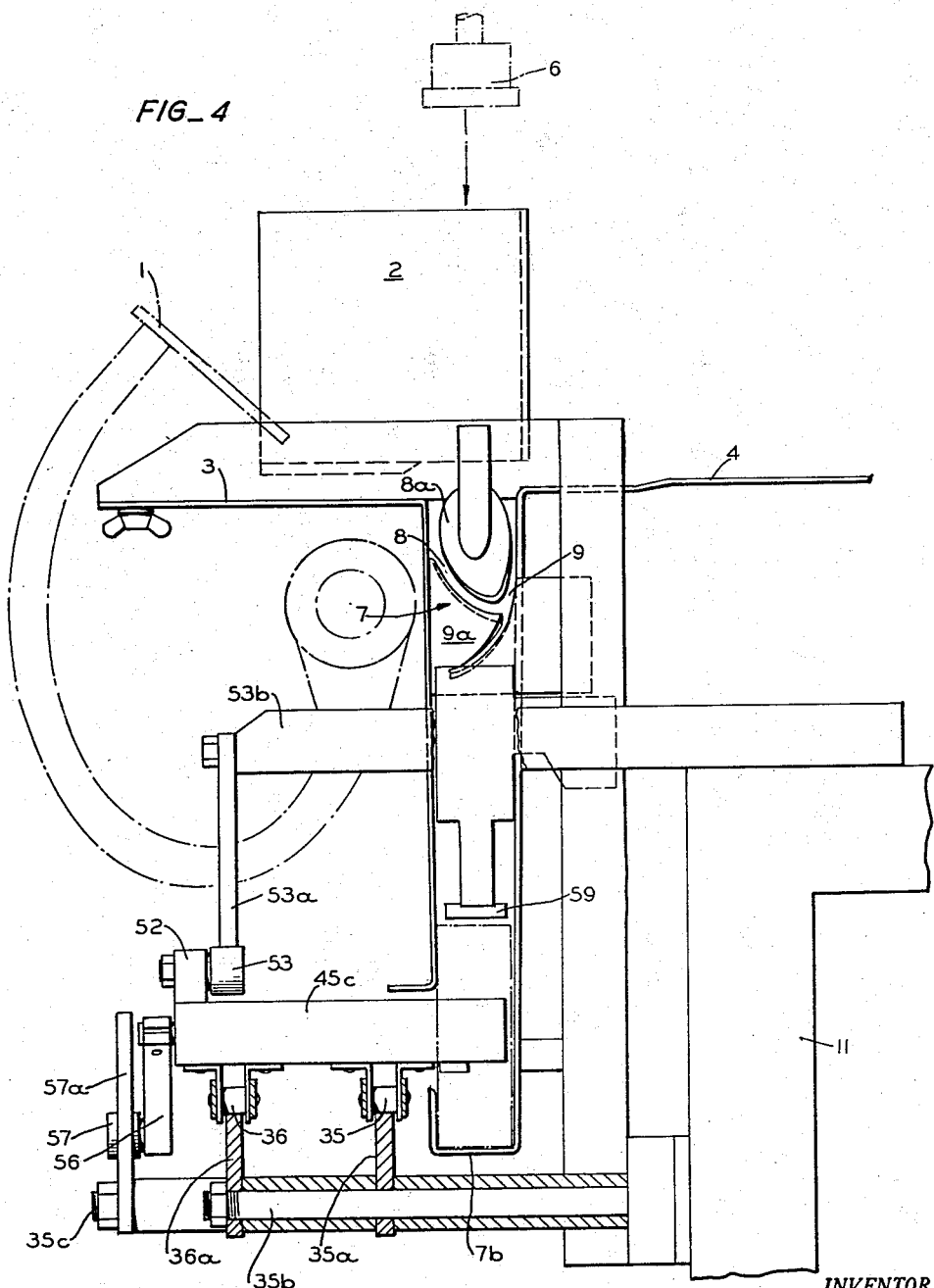

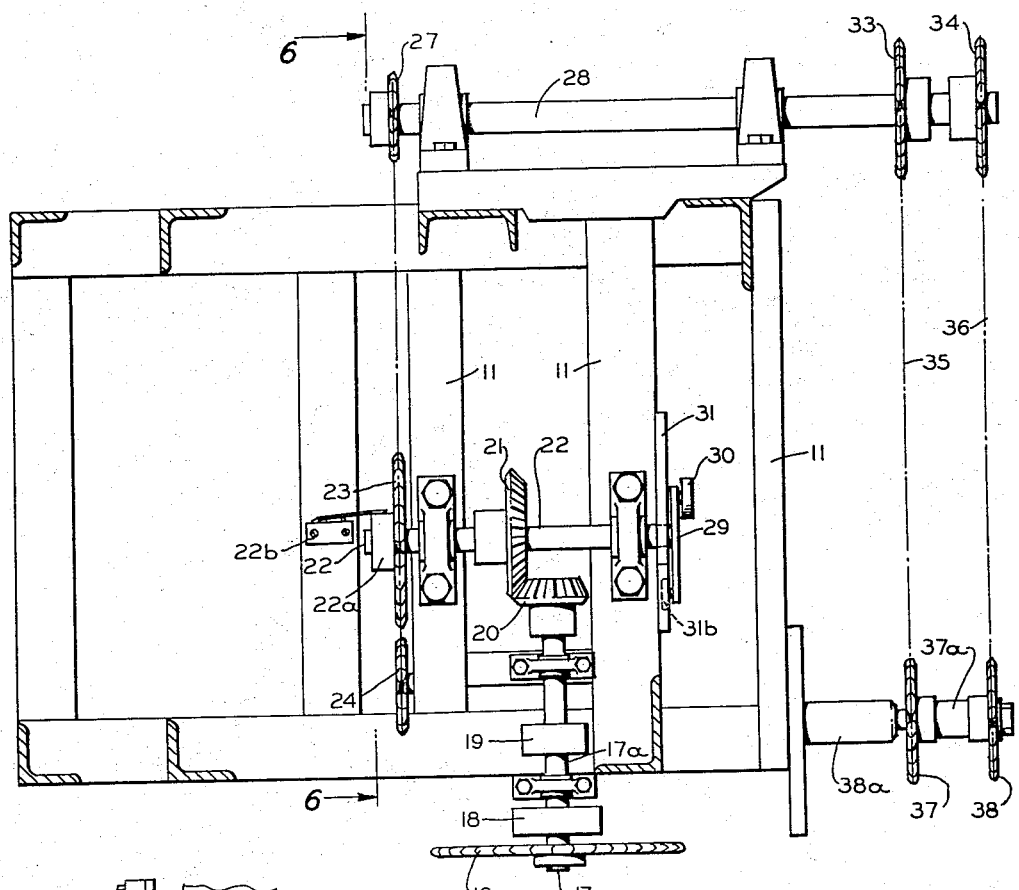
FIG_5
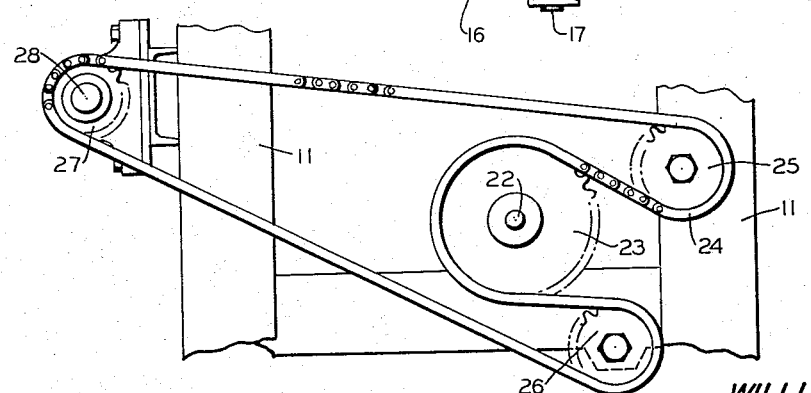
FIG_6

2,994,170
PACKAGING APPARATUS
William R. Bercaw and Ralph L. Byington, San Jose, Calif., assignors, by mesne assignments, to Western Tablet & Stationery Corporation, Dayton, Ohio, a corporation of Delaware
Filed Oct. 14, 1959, Ser. No. 846,309
10 Claims. (Cl. 53—159)

This invention relates to apparatus for counting articles to be packed and wrapping and sealing the packages thereof.

An object of this invention is to provide an improved apparatus for packaging articles.

Another object of this invention is to provide an improved apparatus for packaging articles such as envelopes, an apparatus being characterized in that the various operations thereof are positively inter-connected and driven by a single motor.

Still another object of this invention is to provide an improved apparatus for packaging articles, such as envelopes wherein the envelopes are supplied to a compartment positioned above a sheet of wrapping material, such as cellophane and after a predetermined number of envelopes is placed into this compartment the envelopes and wrapper are forced into a package forming and sealing compartment where the folded ends of the wrapper are sealed and thereafter the top flaps of the package of envelopes are folded down against the package and sealed as the package is shifted laterally from said compartment.

Other and further objects of this invention will be apparent to those skilled in the art to which it relates from the following specification, claims and drawing.

This invention relates to a packaging apparatus of the type disclosed in our application Serial No. 673,449, filed July 22, 1957, and the machine disclosed herein has certain features, for example, the wrapping material feed, envelope feed and counting mechanism and the package forming mechanism, that are quite similar to those disclosed in the aforesaid application. However the present machine is provided with mechanism whereby all of the operating parts of the machine are driven from a common driving motor.

Referring to the drawing briefly:

FIGURE 1 is a side view of an embodiment of this invention;

FIGURE 2 is an end view of the envelope receiving end of this apparatus;

FIGURE 3 is an enlarged view of a portion of the apparatus shown in FIGURE 2;

FIGURE 3a is a plan view of the folding plates for forming the top flaps;

FIGURE 4 is another side view, partially in section, of this apparatus taken from the opposite side of that shown in FIG. 1;

FIGURE 4a is a perspective view of the members employed for forming the end tabs of the envelope carton;

FIGURE 5 is a view of a portion of the driving mechanism employed for driving various working parts of this apparatus;

FIGURE 6 is a view taken along the line 6—6 of the drive shown in FIGURE 5;

FIGURE 7 is a detailed view of the guide mechanism for controlling the angular position of the lever carrying the envelope stuffing pad;

FIGURE 8 is a side view of the gearing arrangement controlling the wrapper cut-off mechanism;

FIGURE 9 is a sectional view taken on the line 9—9 of FIGURE 2;

FIGURE 10 is a side view of the chain carrying the tucker mechanism showing the tucker mechanism erect in solid lines and showing this mechanism collapsed in broken lines;

FIGURE 11 is an end view of the tucker mechanism; and FIGURE 12 is a plan view of the tucker mechanism.

The envelope feeding and counting mechanism employed with this machine is similar to that disclosed in our co-pending application referred to above. Accordingly envelopes are fed by the envelope feeding arm 1 into the envelope receiving compartment 2 which is formed in two sections, separated by the slot 2a, as shown in FIGURE 3. This envelope receiving compartment is elevated above the table 3 so that wrapping material supplied from the roll 5 may be passed along the table 4 and over to the table 3. Thus a certain number of envelopes is assembled in the compartment 2 above the sheet of wrapping material and after the desired number is assembled the plunger 6 is brought down into the envelope receiving compartment thereby pressing the envelopes and wrapping material down into the package forming compartment 7 in which the side flaps of the package are formed and folded on both ends of the package by slots, such as the slots 8 and 9 shown in FIGS. 4 and 4a which together form a Y-shaped configuration and which are formed between the plate members 8a and 9a positioned on each side of the package forming compartment. Thus a pair of these side tab forming slots is employed, one on each side of the envelope forming compartment, to form and fold the side flaps of the package as the package is pressed down through the forming compartment by the plunger 6.

A single motor 10, which may be an electric motor, is employed for driving this envelope wrapping machine and this motor is mounted on the frame 11 of the machine. A reduction gearing (not shown) that is positioned in the housing 10a from which the drive shaft 13 projects is attached to the motor and is driven thereby. This shaft is provided with a sprocket 12 which engages the chain 14 provided for driving the sprocket 16 attached to the shaft 17 which is journaled in suitable bearings positioned on the frame 11. The shaft 17 is connected to the magnetic clutch 18 which couples this shaft to the shaft 17a as shown in FIG. 5. The shaft 17a is provided with a magnetic brake 19 and extends to the bevel gear 20 which is mounted on the inner end thereof. Bevel gear 20 meshes with another bevel gear 21 which is mounted on the shaft 22. The sprocket 23 is mounted on one end of this shaft and the lever 29 is mounted on the other end thereof as shown in FIGURE 5. The sprocket 23, shown in FIGS. 5 and 6, engages the chain 24 which passes over the idler sprockets 25 and 26 and is employed to drive the sprocket 27 that is attached to the shaft 28.

A pair of spaced sprockets 33 and 34 is mounted on the outer end of the shaft 28 and these sprockets engage the chains 35 and 36 respectively. Additional sprockets 37 and 38 are provided, displaced from the driven sprockets 33 and 34, for providing supports for the chains 35 and 36 respectively whereby these chains are supported in positions under the envelope forming compartment for the purpose to be described hereinafter and as illustrated in FIGS. 1 and 2. These additional sprockets are held in spaced relation by a tubular member 37a which is mounted on the stud 38a as shown in FIG. 5.

The lever 29 is fixedly attached at one end thereof, to the shaft 22 (FIGS. 2, 5 and 9) and this lever, at the other end thereof, rotatably engages the stud 29b which is fixedly attached to the arm 32a of the cam lever 32 which is provided with two additional arms 32b and 32c. The arm 32b of the cam lever 32 is provided with a roller 31b which is adapted to travel in the groove 31a of the cam 31 that is attached to the frame 11 by bolts such as 11a. This groove 31a is of irregular configuration for purposes which will be described hereinafter. The arm 32c of the cam lever 32 is provided with a roller 30 pivotally attached to the end thereof and this roller engages the cam follower lever 39 which is pivotally supported on the frame 11 by the pivot-bearing 40. The cam follower lever 39 is provided with an elongated slot in which the roller 30 is moved as the cam lever 32 is oscillated by the shaft lever 29, whereby the follower lever 39 is moved up and down around its pivot 40. The roller 41 that is pivotally mounted on the lower end of the rail 42 is also adapted to move in the slot of the follower lever 39. The rail 42 is accordingly moved up and down in its bearings 43 as the cam follower lever 39 is swung up and down by the cam lever 32 as shown in FIGURE 2 wherein the upper position of the lever 39 is shown in solid lines and its lower position is shown in broken lines.

It will be noted that the end 29a of the shaft lever 29 is substantially wider than the other end thereof and this wider end slidably engages the member 32d (FIG. 9) that is fixedly attached to the cam lever 32 to retain these two levers slidably against each other as they oscillate through a slight angle with respect to each other.

The rail 42 is provided for the purpose of supporting the plunger 6 and moving this plunger up and down. The plunger 6 is attached to the angular shaft 6a, the horizontal portion of which is rotatably supported in the tubular member 6b which is attached to the upper portion of the rail 42 by means of a bracket as shown in FIGURE 1.

A lever 61 shown in FIG. 2 is attached substantially at its mid point to the left hand end of the angular shaft 6a projecting from the tubular member 6b. The lower end of this lever is provided with a roller 62 which is rotatably supported on a stud fastened to this lever and the upper end thereof is provided with a pin 63 to which one end of the spring 64 is attached. The other end of the spring 64 is attached to the pin 65 which is supported on the bracket 66 so that the spring 64 is under tension and normally holds the plunger 6 in the position shown in FIGURE 1, in which position the roller 62 is in engagement with the top portion of the flange 72 provided to the plate 60 as shown in FIGURE 7.

A pair of brackets 69 and 71 are provided to the lower part of the rail 42 as shown in FIGURE 2 and the rollers 67 and 68 are supported on suitable studs provided to the bracket 69 at spaced points thereof such that the rollers 67 and 68 engage opposite surfaces of the frame member 11 when the rail 42 is moved up and down. A roller 70 is pivotally supported on the bracket 71 and this roller engages the face of the frame member 11 shown in FIGURE 2, also when the rail 42 is moved up and down. Thus the rollers 67, 68 and 70 function to keep the rail 42 oriented such that the plunger 6 enters the envelope receiving compartment 2 through the slot 2a and continues on through the slot 7a formed in the package forming compartment 7.

As the rail 42 is moved downward the roller 62 attached to the lever 61 is moved through the race 74 that is provided between the flange 72 and the member 73 of the plate 60 as shown in FIGURE 7.

Near the lower end of the member 73 a member 75 is pivotally supported on the plate 60 by the shaft 76 which is fixedly attached to the member 75 at the upper end thereof and this shaft extends through the plate 60. A lever 76a is attached to the outer end of the shaft 76 and one end of the spring 76b is fastened to the outer end of the lever 76a. The other end of the spring 76b is anchored to the stud 76c which is attached to the plate 60. The spring 76b provides tension whereby the member 75 is normally held in the position shown in FIGURE 7. However when the rail 42 is moved downward so that the roller 62 engages the member 75 this roller forces the member 75 to the position shown in broken lines in FIGURE 7. Further movement of the rail 42 downward moves the roller 62 clear of the lower end of the member 75 thus prmitting the spring 76b to return the member 75 to its original position shown in solid lines in FIGURE 7. This operation takes place when the rail 42 is at its lowest position and thereafter the rail is moved upward through the operation of the follower lever 39 as previously described. The roller 62 does not return to its upper position through the race 74 but is caused to engage the outer surface of the members 75 and 73. As a result the lever 61 is tilted and the shaft 6a is rotated so that during the upward portion of the stroke the plunger 6 is swung out of the slot 7a and it is not returned to its upper position through this slot and through the slot 2a. When the rail 42 is returned to its upper position the plunger 6 is swung through the operation of the spring 64 to its normal position shown in FIGURE 1.

The chains 35 and 36 which are positioned below the package forming compartment, are provided with a pair of devices 44 for tucking in the rear top flap as the package is laterally pushed from the forming compartment. The devices are of similar construction so detail description of only one such device will be given in connection with FIGS. 10, 11 and 12. Each of these devices includes a base plate 45 that is attached to the chains 35 and 36 by the angle members 46—47 and 48—49 respectively. The angle members 46 and 47 are attached to links of the chain 35 and they are attached to the bottom surface of the base member 45. Likewise the angle members 48 and 49 are attached to links of the chain 36 and they are attached to the base of the base member 45. The tucker shaft 50 which is of angular configuration is rotatably supported in the members 51 and 52 which are attached to the upper surface of the base member 45. The member 52 is provided with an aperture in which the bolt 54 which supports the roller 53 on the inner end thereof is attached. The roller 53 is positioned to engage the bottom edge of the top tucker cam 53a shown in FIG. 2, as the tucker device 44 is moved laterally with respect to the bottom end of the package forming compartment as shown in FIGS. 1 and 4. The arm 56 is fixedly attached to the outer end of the tucker shaft 50 and the roller 57 which is rotatably supported at the free end of this arm 56 by the bolt 58, is supported thereby in alignment with the roller tucker cam 57a shown in FIGS. 2 and 4. When the roller 57 engages the cam 57a, the arm 56 is moved upward; that is it is tilted to the position shown in solid lines in FIG. 3 whereby the tucker mechanism is swung into its upright position.

The portion 50a of the tucker shaft 50 is disposed substantially at right angles to the remainder of this shaft and the head 55 is fixedly attached to the free end of this angularly disposed portion. The forward end of the head 55 is provided with a pair of projections 55a which perform the tucking operation as will be described hereinafter. A pin 55c is attached to the rear portion of the head 55 and this pin forms one anchor for the spring 55d, the other end of which is attached to the pin 55e that is positioned on the block 55f which is attached to the inner end of the base 45. Thus when the head 55 is in elevated position, the spring 55d is extended and provides spring tension tending to return it to its lower position in which the shaft portion 50a is more or less in alignment with the portion 45b of the base which extends to the rear thereof and the rear surface of the head 55 rests on said portion 45b.

Accordingly when the tucking device 44 is advanced toward the bottom of the package forming compartment so that the projections 55a on the head thereof come into engagement with the upper left-hand corner of the package to tuck in the flaps thereof, the roller 57 engages the inclined portion of the lower tucking cam 57a and the head 55 of the tucking device is elevated by the angular shaft portion 50a as shown in FIG. 3. In this position the angular shaft portion 50a engages the projection 45d that is attached to the top end portion of the package pad 45c which is supported by the base 45. This package pad 45c also engages the left-hand side of the package and pushes this package laterally from the package forming compartment. At the same time the projections 55a of the head 55 are positioned at the top left-hand corner and somewhat inward over this corner of the package, thereby initiating the forming of the folds on this corner by tucking in the wrapping material. It will be noted that the bottom tucking cam 57a abruptly terminates at a position opposite about midway of the package forming compartment and when the tucking device 44 is moved so that the roller 57 leaves the right-hand end of this cam 57a, then the spring 55d pulls the angular shaft 50a and tucking head 55 downward so that the rear portion of the head 55 engages the extending member 45b. This action is facilitated by the member 59 (FIG. 3) which engages the head 55 as the latter is moved laterally through the bottom of the package forming compartment and as a result the tucking device mechanism is brought to its horizontal position as shown in broken lines.

Rods 35c (FIGS. 2 and 4) are attached to the frame and extend outward below the package forming compartment and between the upper and lower portions of the chains 35 and 36 to support the chain rails 35a and 36a and also for the tucker cam 57a. An additional rod 35b is used to support the right hand portions of the rails 35a and 36a and inasmuch as the tucker cam 57a is positioned out beyond the chains 35 and 36 the rod 35c supporting this cam are longer than the rod 35b which extends only through the chain supporting rails 35a and 36a as shown in FIGURE 4. Suitable tubular spacer elements are provided to these rods so that the rail 35a is positioned under the upper portion of the chain 35 at the desired distance from the frame of the machine and also so that the other rail 36a is positioned under the upper portion of the chain 36 at a desired distance from the rail 35a and also to position the tucker cam 57a opposite the roller 57. A pair of horizontally extending supports such as the support 53b shown in FIGURE 4 is provided for holding the upper tucker cam 53a so that the lower edge of this cam is positioned in line with path of the roller 53.

Two electrically energized heating units 80, one on each side of the package forming compartment 7, are supported by links 81 so that these heating units which are provided with a flat surface for engaging the ends of the package, heat seal the flaps thereof as the package is pushed down through the forming compartment 7. After the package is pushed down to the bottom 7b shown in FIGURE 4 the left hand side of the package is engaged by the package pad 45c of the tucker mechanism and the projections 55a of this mechanism engage the top portions of the end flaps at the upper left hand corner of the package and tuck these flaps inward over the top of the envelopes between the long side flaps. At the same time the upper right hand corner of the package is brought into engagement with the shoe 59, shown in FIG. 3, which folds the top portions of the opposite end flaps down over the tops of the envelopes as the package is pushed under this shoe toward the blades 82 and 83 which are illustrated in detail in FIGURES 3 and 3a. These blades function to fold the long side flaps over the top of the package toward each other to close the top of the package as the package is shifted laterally out of the forming compartment.

As previously mentioned the electrical heating members 80 are supported just below the end fold plates 9a so that the folded ends of the package pass these heating elements in contact with the heated surface thereof whereby these folded ends are heat sealed. Likewise after the package is pushed out of the package forming compartment with the top side flaps thereof passing through the folding blades 82 and 83 these flaps are heat sealed by the heating unit 84.

The mechanism for feeding the wrapping paper from the roll 5 in this machine is similar to that disclosed in the previously mentioned application, Serial No. 673,449, and comprises the feed rollers 90 and 91 shown in FIG. 1 in broken lines. These feed rollers 90 and 91 are mounted on the shafts 94 and 95 respectively which are also provided with sprockets 92 and 93 respectively, as shown in FIG. 8. Sprocket 93 meshes with an idler sprocket 96 which meshes with the sprocket 97 and this in turn meshes with the sprocket 98, that is driven by the shaft 13a which rotates the cutter mechanism (not shown). The shaft 13a is connected to the motor 10 by means of a suitable magnetic clutch similar to that in the previously mentioned application, and it is also provided with a magnetic brake to prevent undesired rotation. A suitable cam (not shown) is also provided to the shaft 13a and this cam operates the electric switch 99.

After a predetermined number of envelopes is placed into the envelope-receiving compartment 2 the electronic counter (not shown) supplies a signal which controls a suitable relay (not shown) that causes the clutch 18 to be energized and closed and it also supplies power to open the brake 19, so that the sprocket 16 driven by the motor 10 then rotates the shaft 17a and 22, shown in FIG. 5. The shaft 22 operates the levers 29 and 32, shown in FIG. 2, and the follower-arm 39 is moved downward so that the rod 42 is caused to move downward whereupon the pad 6 is brought into engagement with the tops of the envelopes positioned in compartment 2, presses these envelopes down against the wrapping material positioned on the plates 3 and 4, shown in FIG. 4. The pad 6 forces the envelopes and the wrapping material downward into the forming compartment 7, as rapidly as possible, so that feeding of envelopes to the envelope-receiving compartment 2 by the member 1 need not be interrupted. The groove 31a of the cam is shaped so that this first part of the stroke of the pad 6 is as rapid as possible. After the envelopes are pressed by the plunger pad 6 into the top of the compartment 7 so that the grooves 8 and 9 form the end folds on the package wrapper these end folds are brought into engagement with the heaters 80, whereby the folded ends of the package are heat-sealed. During this part of the cycle of operation the envelopes and the wrapper are moved at a slower rate by the pad 6 so that sufficient time is allowed for proper heat-sealing of the ends of the wrapper and the groove 31a of the cam is shaped with this end in view. When the plunger pad 6 is at its lowest point of travel the follower arm 39, which moves the rod 42 and the plunger pad 6, is of course at its lowest position as shown in broken lines in FIG. 2. On the return stroke of this follower-arm 39, the rod 42 is brought upward and during the return stroke of the rod 42 the plunger pad 6 is deflected in the direction of the arrow shown in FIG. 1. This deflection is produced by causing the roller 62, which is pivotally mounted on one end of the lever 61, to follow a different path on the return stroke, as shown in FIG. 7. About two-thirds of its way up on its return stroke the roller 62 engages the actuating arm of the switch 62a and closes this switch for an instant. This switch is connected to a suitable relay which controls the energization of the electric clutch and electric brake provided to the feed roller shaft 13a, so that this shaft is connected to the motor 10 and the cutter and feed rollers are caused to rotate to feed wrapping paper from the roll 5 on to the plates 4 and 3 shown in FIG. 4. When rotation of the shaft 13a is initiated the cam 99a closes the switch 99 which is connected to control the energization of the electric clutch on the feed roller shaft 13a after energization of this clutch was initiated by closing of the switch 62a and switch 99 remains closed during the balance of one revolution of the shaft 13a after which it is opened by the cam 99a. After the cutter is rotated through one revolution, the cam 99a on the shaft 13a engages the actuating arm of the switch 99 and opens this switch thereby opening the circuit of the cutter clutch so that the shaft 13a is disengaged from the motor 10. It also functions to energize the brake which causes instantaneous stopping of the cutter after the cutter has severed the desired length of wrapping material from the supply. The severed piece of wrapping material is then in position on the plates 3 and 4 under the envelope-receiving compartment 2 so that on the next downward stroke of the plunger pad 6 the group of envelopes accumulated in this compartment may be pressed down upon the wrapping material and thereafter the envelopes and wrapping material may be pressed into the package forming compartment.

However, when the rod 42 and the plunger pad 6 reach the top of their vertical stroke the limit switch 22b, which is actuated by the cam 22a that is mounted on the shaft 22 as shown in FIG. 5, is opened to de-energize the circuit at the end of each cycle of operation and also to leave the circuit in condition to be actuated by the next signal received from the electronic counter to repeat the cycle of operation.

While we have shown a preferred embodiment of the invention it will be understood that the invention is capable of variation and modification from the form shown so that its scope should be limited only by the scope of the claims appended hereto.

What we claim is:

1. Apparatus for wrapping a plurality of articles into a package comprising an article receiving compartment for receiving a plurality of the articles to be wrapped, means for feeding the articles to said compartment one after another, a motor, means driven by said motor for passing a web of wrapping material under said compartment, a package forming compartment under said receiving compartment and in alignment therewith, means driven by said motor for pressing the articles received in said receiving compartment upon said web and with said web into said forming compartment, said forming compartment having ends provided with slots for receiving the end portions of said web to form end tabs from said end portions as said articles and said web are pressed through said forming compartment, said pressing means comprising a reciprocating member, a cam, a follower lever engaging said reciprocating member, a crank driven by said motor having means engaging said cam and said follower lever, whereby said driven crank and said follower lever impart reciprocatory motion to said member, said cam being shaped such that said pressing means is moved rapidly enough while it is pressing said articles out of said receiving compartment so that said articles are moved out of this compartment before the next article is supplied thereto, a conveyor having package engaging means, means driven by said motor for moving said conveyor to bring said engaging means against the package and shift it out of the bottom of said forming compartment, means for tucking in the top ends of the end flaps of the package as said package is shifted out of said forming compartment and means for folding the top side flaps of the package over the top thereof after said top end flaps are tucked in.

2. Apparatus for wrapping a plurality of articles into a package as set forth in claim 1 further characterized in that said pressing means also comprises a shaft attached to said reciprocating member, an arm attached to said shaft, and a pad attached to said arm, said pad being adapted to engage the articles accumulated in the receiving compartment during the forward stroke of said reciprocating member and means for deflecting said pad during the return stroke so that said pad is not returned through said compartments.

3. Appartus for wrapping a plurality of articles into a package as set forth in claim 2 further characterized in that said deflecting means includes an auxiliary lever attached to one end of said shaft, and said means for deflecting said pad comprises means for engaging said auxiliary lever for rotating said shaft through a predetermined angle at the beginning of the return stroke.

4. Apparatus for wrapping a plurality of articles into a package as set forth in claim 3 further characterized in that said means for rotating said shaft comprises guide means for guiding said auxiliary lever along one path during the forward stroke of said reciprocating member and a displaced path during the return stroke whereby said lever, said arm and said pad are tilted during the return stroke so that said pad is not returned through said compartments during said return stroke.

5. Apparatus for wrapping a plurality of articles into a package as set forth in claim 1 further characterized in that the means for tucking in the top ends of the end flaps includes a tucking device, means for pivotally attaching said tucking device to said conveyor, a package engaging pad attached to said conveyor, and a stationary cam for engaging said last mentioned means and moving said tucking device against said package as said package is moved out of said forming compartment by said last mentioned pad.

6. Apparatus for wrapping a plurality of articles into a package comprising an article receiving compartment adapted to receive a plurality of the articles to be wrapped, means for feeding the articles to said compartment one after another, a motor, means driven by said motor for passing a web of wrapping material under said compartment, a package forming compartment under said receiving compartment and in alignment therewith, means driven by said motor for pressing the articles from said receiving compartment after a predetermined number of articles is fed to said receiving compartment, said last mentioned means being connected to said motor by a cam shaped so that said last mentioned means presses said predetermined number of articles out of said rereiving compartment before the next article is fed thereto, said forming compartment being positoned to receive said predetermined number of articles and said web as said articles are pressed from said receiving compartment, said forming compartment having sides provided with slots for receiving the end portions of said web to form end flaps from said end portions as said articles and said web are pressed through said forming compartment, a conveyor having package engaging means, means driven by said motor for moving said conveyor to bring said engaging means against the package and shift it out of the bottom of said forming compartment, means for tucking in the top ends of the end flaps of the package as said package is shifted out of said forming compartment and means for folding the top side flaps of the package over the top thereof after said top end flaps are tucked in.

7. Apparatus for wrapping a plurality of articles into a package as set forth in claim 6 further comprising heating means positioned in the sides of said forming compartment below said slots for engaging and sealing said end flaps as said articles and said web are pressed through said package forming compartment.

8. Apparatus for wrapping a plurality of articles into a package as set forth in claim 7 further characterized in that said cam is also shaped to decrease the speed with which said articles and said web are pressed past said heating means so that said end flaps are heated sufficiently to be sealed.

9. Apparatus for wrapping a plurality of articles into a package comprising an article receiving compartment for receiving a plurality of the articles to be wrapped, a motor, means driven by said motor for passing a web of wrapping material under said compartment, a package forming compartment under said receiving compartment and aligned therewith, plunger means rotatably supported on a rod driven by said motor for pressing the articles received in said receiving compartment upon said web and with said web into said forming compartment during the forward stroke of said rod, said forming compartment having sides provided with slots for receiving the end portions of said web to form end tabs from said end portions as said articles and said web are pressed through said forming compartment, guide means for rotating said plunger means to deflect said plunger means from said compartments during the return stroke of said rod, a conveyor having package engaging means, means driven by said motor for moving said conveyor to bring said engaging means against the package and shift it out of the bottom of said forming compartment, means for tucking in the top ends of the end flaps of the package as said package is shifted out of said forming compartment and means for folding the top side flaps of the package over the top thereof after said top end flaps are tucked in.

10. Apparatus for wrapping a plurality of articles into a package comprising an article receiving compartment for receiving a plurality of the articles to be wrapped, means for feeding articles to said compartment, a motor, means driven by said motor for passing a web of wrapping material under said compartment, a package forming compartment under said receiving compartment and aligned therewith, plunger means driven by said motor for pressing the articles received in said receiving compartment upon said web and with said web into said forming compartment during the forward stroke of said plunger means, said forming compartment having sides provided with slots for receiving the end portions of said web to form end flaps from said end portions as said articles and said web are pressed through said forming compartment, means positioned below said slots for sealing said end flaps, means for controlling the motion of said plunger means so that said plunger means removes the articles from said receiving compartment rapidly enough so as not to interfere with said feeding means and also so that the motion of the articles and wrapping web through said forming compartment is slow enough for sealing said end flaps, a conveyor having package engaging means, means driven by said motor for moving said conveyor to bring said engaging means against the package and shift it out of the bottom of said forming compartment, means for tucking in the top ends of the end flaps of the package as said package is shifted out of said forming compartment and means for folding the top side flaps of the package over the top thereof after said top end flaps are tucked in.

References Cited in the file of this patent

UNITED STATES PATENTS

| | | |
|---|---|---|
| 1,839,152 | Heywood | Dec. 29, 1931 |
| 1,913,727 | Shaffer et al. | June 13, 1933 |
| 2,538,564 | Jensen et al. | Jan. 16, 1951 |
| 2,609,646 | Total | Sept. 9, 1952 |
| 2,685,157 | Doepel et al. | Aug. 3, 1954 |
| 2,911,774 | Frank et al. | Nov. 10, 1959 |